Sept. 3, 1940. L. GADDONI 2,213,836
AUTOMATIC HYDRAULIC CLUTCH MECHANISM
Filed Feb. 7, 1939
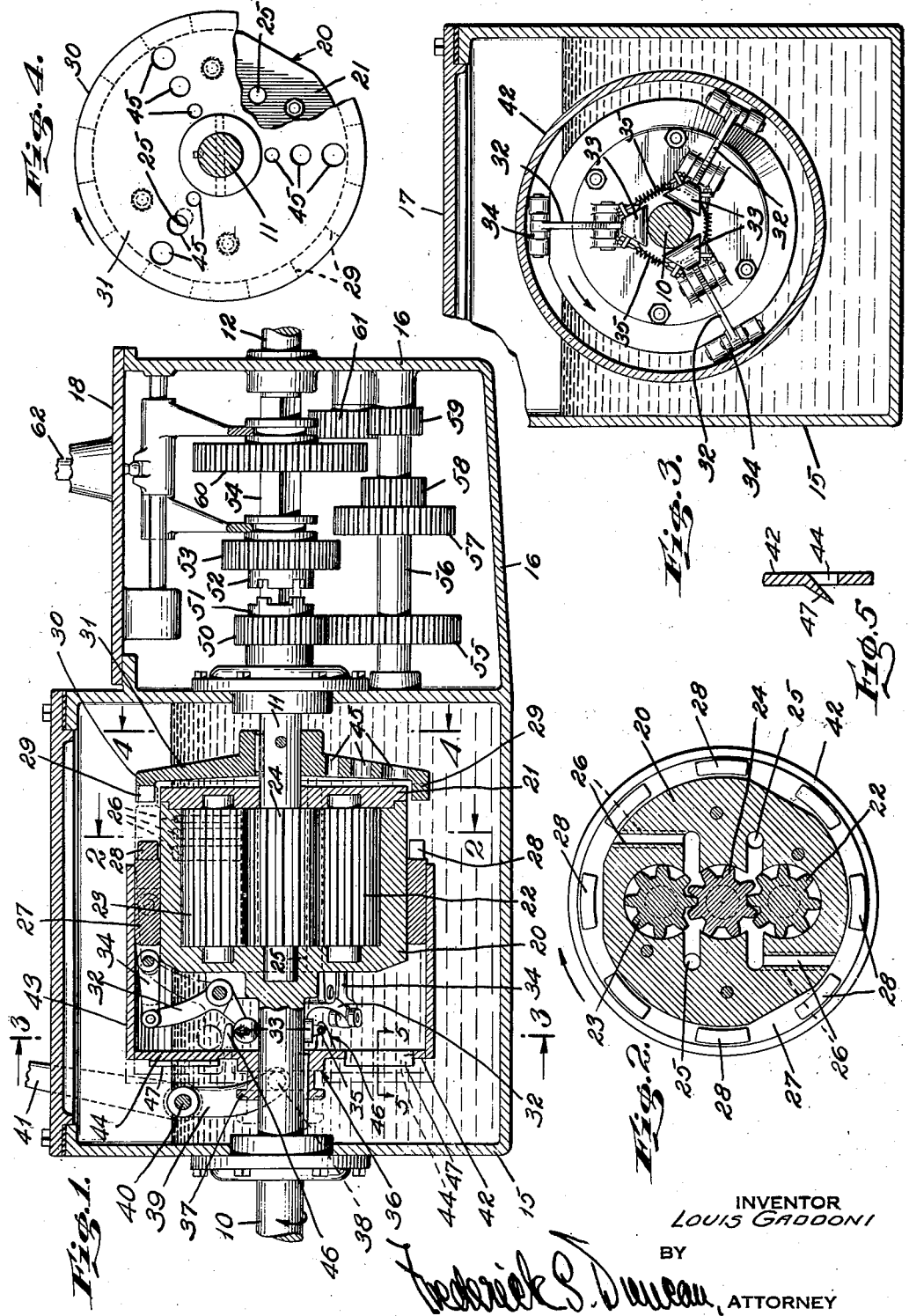
INVENTOR
LOUIS GADDONI
BY
ATTORNEY Patented Sept. 3, 1940

2,213,836

UNITED STATES PATENT OFFICE 2,213,836

AUTOMATIC HYDRAULIC CLUTCH MECHANISM

Louis Gaddoni, New Rochelle, N. Y.

Application February 7, 1939, Serial No. 255,047

13 Claims. (Cl. 192—57)

This invention relates to an automobile hydraulic clutch mechanism for transmitting rotational movement from one shaft to another shaft to produce variable speeds of the driven shaft.

One object of the invention is to provide a sturdy and simple hydraulic clutch mechanism which will replace the present friction clutch mechanism, or the same and the gear transmission mechanism, mounted between any gas or oil engine, steam turbine, Diesel or electric motor or other mechanism or drive shaft and a driven or the propelled shaft of a motor boat, automobile or any other moving vehicle or any other machine for which a device is necessary to gradually transfer the rotating movement of any power or driving shaft to a driven shaft to rotate and accelerate the latter from stationary position to any desired rotational speed and to the speed of the driving shaft for locking direct drive of the driven shaft.

Other objects of the invention consist in improved means whereby the amount of liquid supply used in the hydraulic clutch and/or transmission mechanism is not critical, improved means for providing a continuous supply of liquid under pressure at the admission intake or suction side of the liquid pump or liquid displacing mechanism and automatic means for controlling, restricting, and cutting off the amount of liquid displaced by the pump mechanism, mechanism for disabling such automatic means under certain conditions, improved means for connecting the driven shaft to the driving shaft positively automatically for direct drive after the driven shaft has attained a rotational speed substantially equal to that of the driving shaft, and manual means for locking said connecting means in either its operative or inoperative positions.

Other objects of the invention will appear from the following description taken in connection with the drawing, in which—

Fig. 1 is a longitudinal sectional view through housings containing my improved hydraulic clutch mechanism and a conventional form of gear shift mechanism, showing the clutch mechanism in central vertical section;

Fig. 2 is a section of the hydraulic clutch mechanism taken on the line 2—2 of Fig. 1;

Fig. 3 is a section taken on the line 3—3 of Fig. 1;

Fig. 4 is a section taken on line 4—4 of Fig. 1; and

Fig. 5 is a section on the line 5—5 of Fig. 1.

The mechanism disclosed may be used in any machine or the like in which it is desired to transmit rotational movement from a drive shaft to a driven shaft and for the purpose of illustration I have disclosed my invention in connection with driving and driven shafts which may be the crank and transmission shafts of an automobile, and I have shown my improved hydraulic clutch in connection with a conventional form of gear shift mechanism employed in automobiles. It is to be understood however that my invention is not limited to such use.

I have shown a driving shaft 10 which may be the crank shaft of an automobile engine or may be a shaft suitably connected thereto and a driven shaft 11 which may be the transmission shaft of an automobile or which may correspond to the shaft which enters a gear box to drive the transmission shaft 12 at variable speeds forward and in reverse directions. The shafts 10 and 11 may be mounted in suitable oil tight bearings in the walls of the clutch housing 15 and the shaft 12 may be mounted in a suitable bearing in the rear wall of the gear shift housing 16 and as disclosed the housings may be made integral with each other. The housings may be provided with cover plates 17 and 18 which may be secured to the housings in any suitable manner.

Integrally connected to the shaft 10 or connected thereto in any suitable manner is a cylindrical pump casing 20, which may comprise two parts as indicated, one of which is a cover plate 21, provided with bearings in which are mounted the trunnions of rotatable pump gears 22 and 23, which mesh with a gear 24 suitably secured to the shaft 11 and which shaft may have a bearing in the pump casing 20 as illustrated. For the purpose of supplying oil to the gears, the pump casing 20 including the cover plate 21 are preferably provided with admission ports 25 extending from end to end of the casing and arranged in parallel relation to the casing axis. These ports communicate with the gears to supply the gears with oil or other liquid that may be used. The oil pumped by the gears is forced out through a plurality of series of radially extending delivery ports 26 which are of graduated size as more particularly illustrated in Fig. 1.

For the purpose of controlling the amount of liquid delivered by the pumps, I provide a sleeve member 27 which surrounds and slidably but non-rotatably engages the outer face of the pump casing. Any suitable means will be employed for causing the sleeve to rotate with the pump casing. The series of delivery ports are so arranged that on first movement of the throttling sleeve toward the right Fig. 1, the largest one of the delivery ports will be closed and the ports will be closed in succession so that the smallest port will be closed last but approximately at the time that teeth 28 formed on the sleeve 27 are in close proximity to teeth 29 formed on the cylindrical flange 30 on the disk 31 secured to the shaft 11 by any suitable means as indicated. With the parts in the position shown in Fig. 1, the pump casing and gears 22 and 23 are carried about the gear 24 without transmitting power to the shaft 11. As the throttling sleeve is moved toward the right the delivery of the liquid is restricted and the shaft 11 is caused to follow the rotation of the shaft 10 and by moving the throttling sleeve farther to the right shaft 11 may be caused to rotate at substantially the same speed as shaft 10 and then the throttling sleeve may be moved farther to the right to directly couple the shaft 11 to the shaft 10 for the purpose of providing a direct drive between the shafts.

In my application Serial No. 205,246, filed April 30, 1938, now Patent 2,207,538 granted July 9, 1940, wherein I disclose a hydraulic clutch of substantially the same construction as described, the throttling sleeve is operated by a manually operated lever. In accordance with my improvements I provide means for automatically operating the throttling sleeve under control of the speed of shaft 10. This means may as disclosed comprise a suitable governor mechanism including in the present instance a plurality of bell crank arms 32 pivoted on the end wall of the casing 20 in any suitable manner as indicated, the free ends of the inner crank arms being provided with weights 33 which are preferably cylindrical in shape as indicated and the outer crank arms of which are connected by links 34 to the throttling sleeve 27 in any suitable manner as indicated.

For the purpose of restoring the governor arms to the normal position shown in Figs. 1 and 3 I have provided spring means such as 35 which as disclosed I may connect to the weights of the inner crank arms so that any upward movement of the weighted crank arms will tension the springs, which springs will cause the governor mechanism to be restored when the speed of the shaft 10 is reduced and brought to rest. The parts of the governor mechanism may be so proportioned that the shaft 11 will be connected to the shaft 10 for direct drive at any desired speeds such as speeds in cases where the invention is applied to an automobile may be any speeds between 20–25 miles per hour. As the shaft 10 is rotated from a position of rest the initial low speed of rotation of the shaft will not be transmitted to the shaft 11 but as the speed of the shaft 10 picks up the throttling sleeve will be automatically moved to the right and the shaft 11 will be caused to follow the rotation of the shaft 10 and as the speed of the shaft 10 is further increased the shaft 11 will be rotated at substantially the same speed as the shaft 10 and the teeth 28 on the throttling sleeve 27 will be engaged with the teeth 29 on the disk 31. The shaft 11 will then be directly rotated by the shaft 10.

For the purpose of disabling the governor mechanism as in the case when it is desired to rotate the shaft 10 at fairly high speeds without communicating rotation to the shaft 11, I provide a sliding member 36 which is provided with a grooved hub 37 into which extend pins 38 on a pair of arms 39, only one of which is illustrated, but which is of well-known construction, connected to a shaft 40 supported in the side walls of the housing 15 to one outer end of which is connected an operating lever 41. The member 36 comprises a disk 42 provided with a wide cylindrical flange 43 surrounding and slidably engaging the throttling sleeve 27. The disk 42 is provided with slots 44 which are formed by pressing out material to form scoops or pumping elements 47 for the purpose of forcing oil into the space between the member 36 and the pump casing to supply the admission ports 25 at one end of the pump casing with oil. The driven disk 31 before referred to is also preferably provided with a plurality of holes 45 admitting oil to enter the space between the driven disk 31 and the other end of the pump casing to supply the other ends of the admission ports 25 with oil.

Secured to the disk 42 of the member 36 are a plurality of locking lugs 46 which may be tapered as shown to engage and cam the weights 33 either into the full line or the dot and dash line position shown in Fig. 1. If it is desired to speed up the shaft 10 without transmitting movement to the shaft 11, then the member 36 is shifted to the right Fig. 1 to lock the weights 33 in the position shown in full lines, against movement outwardly and if it is desired holding the throttling sleeve 27 in its extreme right hand position in which the shafts 10 and 11 are coupled together for direct drive then the member 36 is moved to the right to lock the weights 33 in the position shown in dot and dash lines. By means of this construction the automatic governor device may be rendered inoperative and the shaft 10 may be rotated at any speed without transmitting movement to the shaft 11 or the shaft 10 may be caused to transmit movement by direct drive to the shaft 11 at lower speeds than the speed at which such direct drive is provided under control of the governor mechanism.

In order to bring out some of the uses to which this locking and disabling mechanism may be put, I have disclosed a conventional form of gear shaft mechanism in the housing 16 which provides for driving the transmission shaft 12 at different speeds forwardly and for driving the shaft reversely. Connected to the shaft 11 is a gear 50 provided with a hub 51 having a clutch face which is adapted to be engaged by a movable clutch member 52 carrying a gear 53, slidably mounted on a squared section 54 of the shaft 12. When the clutch 52 is engaged with the clutch member 51, the shaft 12 will be rotated at the same speed as the shaft 11. In mesh with the gear 50 is a gear 55 connected to a shaft 56 on which are mounted gears 57, 58, and 59. When the gear 53 is moved to the right to engage with the gear 57, the shaft 12 will be rotated at a slower speed corresponding to second gear as is well understood. Also slidable on the squared section 54 is a gear 60 which when moved to the left will engage with the gear 58 causing the shaft to be driven at low speed. When the gear 60 is moved to the right into mesh with a reversing gear 61 which is in mesh with the gear 59, then the shaft 12 will be rotated in the reverse direction. The gears are controlled by suitable mechanism as indicated from the gear shift lever 62 as is well understood.

In the majority of cases it will not be necessary to employ any gear shift mechanism with the automatic clutch mechanism disclosed as variable speeds of rotation of the shaft 11 or shaft 12 may be obtained by shifting the throttling sleeve 27 under control of the governor mechanism disclosed. The gear shift lever 62 may therefore be left in high position under ordinary starting and stopping and accelerating and decelerating operations. If it is assumed that the gear shift lever is in the high position and that the engine shaft is started from the position of rest, by moving the member 36 to the right to disable the governor mechanism the shaft 10 may be rotated at high speeds without transmitting any movement to the shaft 11, as for example during the operation of warming up the engine. After the engine runs smoothly the member 36 may be moved to the left to enable the governor mechanism to function automatically, control the throttling sleeve, causing the shaft 11 to follow the rotation of the shaft 10 and to pick up and rotate at the same speed as the shaft 10 when all of the delivery ports in the pump casing have been closed at which time upon further acceleration of the shaft 10 the shafts 11 and 10 will be locked together for direct drive. The gear shift lever may be operated after slowing down the speed of the engine and shaft 10 which disconnects the direct drive and after shifting has been effected acceleration of the engine and the shaft 10 will again effect a direct drive connection between the shafts 10 and 11.

If it is desired to use the engine as a brake as when running down steep hills, the member 36 when the engine shaft is still rotated at the proper speed to effect a direct drive connection, will be moved to the right to lock the governor mechanism in its outward operated position to hold the teeth on the throttling sleeve engaged with the teeth on the driving disk 31 providing for a direct drive between the shafts 11 and 10 at low speeds, such as may be required in descending steep hills.

I have disclosed for the purpose of illustration one mechanism for carrying out the objects of my invention but it is to be understood that modified forms of this mechanism may be employed and that therefore I reserve the right to use all such changes as fall within the principles of the invention disclosed and the scope of the appended claims.

I claim:

1. In a fluid transmission mechanism, the combination of driving and driven shafts, a fluid displacing mechanism operated by the driving shaft for transmitting motion to the driven shaft, means for controlling the amount of fluid displaced by said fluid displacing mechanism, means responsive to the speed of the driving shaft for controlling said fluid displacing controlling means, and manually controlled means for locking said speed responsive means in no-speed and full-speed positions.

2. In a fluid transmission mechanism, the combination of driving and driven shafts, of a rotating gear fluid displacing mechanism including a casing connected to the driving shaft, fluid displacing gears mounted in said casing and a gear connected to the driven shaft in mesh with said first mentioned gears, means for controlling the amount of fluid displaced by said fluid displacing mechanism, means for locking said shafts directly together for direct drive, and means responsive to the speed of the driving shaft for controlling said last mentioned means to effect a direct connection between said shafts at predetermined speeds.

3. In a fluid transmission mechanism, the combination of driving and driven shafts, of fluid displacing mechanism connecting said shafts comprising a cylindrical casing connected to the driving shaft, pump gears mounted within said casing and a gear in mesh with said gears connected to the driven shaft, a throttling sleeve surrounding said casing, said casing being provided with delivery ports through which fluid is delivered by said displacing mechanism and said sleeve being adapted to be moved to close said ports, and means responsive to the speed of the driving shaft for operating said throttling sleeve.

4. In a fluid transmission mechanism, the combination of driving and driven shafts, of fluid displacing mechanism connecting said shafts comprising a cylindrical casing connected to the driving shaft, pump gears mounted within said casing and a gear in mesh with said gears connected to the driven shaft, a throttling sleeve surrounding said casing, said casing being provided with delivery ports through which fluid is delivered by said displacing mechanism and said sleeve being adapted to be moved to close said ports, a disk mounted on said driven shaft, said disk and sleeve being provided with opposed interengaging means, and means responsive to the speed of the driving shaft for operating said throttling sleeve to control said delivery ports and to interengage said means on said throttling sleeve and said disk at a predetermined speed.

5. In a fluid transmission mechanism, the combination of driving and driven shafts, of fluid displacing mechanism connecting said shafts comprising a cylindrical casing connected to the driving shaft, pump gears mounted within said casing and a gear in mesh with said gears connected to the driven shaft, a throttling sleeve surrounding said casing, said casing being provided with delivery ports through which fluid is delivered by said displacing mechanism and said sleeve being adapted to be moved to close said ports, a disk mounted on said driven shaft, said disk and sleeve being provided with opposed interengaging means, means responsive to the speed of the driving shaft for operating said throttling sleeve to control said delivery ports and to interengage said means on said throttling sleeve and said disk at a predetermined speed, and manually controlled means for locking said speed responsive means in the position it occupies at zero speed of the driving shaft and the position it occupies at the time said means on said sleeve and disk are interengaged.

6. In a fluid transmission mechanism, the combination of driving and driven shafts, of fluid displacing mechanism comprising a cylindrical casing secured to the driving shaft, fluid displacing gears mounted within said casing and a gear in mesh with said gears and secured to the driven shaft, a throttling sleeve surrounding said casing and slidable thereon, said casing being provided with radially extending delivery ports adapted to be controlled by said throttling sleeve, said casing also being provided with intake ports extending parallel with the casing axis, and means for feeding liquid to said intake ports.

7. In a fluid transmission mechanism, the combination of driving and driven shafts, of fluid displacing mechanism comprising a cylindrical casing secured to the driving shaft, fluid displacing gears mounted within said casing and a gear in mesh with said gears and secured to the driven shaft, a throttling sleeve surrounding said casing and slidable thereon, said casing being provided with radially extending delivery ports adapted to be controlled by said throttling sleeve, said casing also being provided with intake ports extending parallel with the casing axis, means for feeding liquid to said intake ports, said means comprising a disk rotatable with said driving shaft, and scoops on said disk for feeding liquid to said intake ports.

8. In a fluid transmission mechanism, the combination of driving and driven shafts, of fluid displacing mechanism comprising a cylindrical casing secured to the driving shaft, fluid displacing gears mounted within said casing and a gear in mesh with said gears and secured to the driven shaft, a throttling sleeve surrounding said casing and slidable thereon, said casing being provided with radially extending delivery ports adapted to be controlled by said throttling sleeve, said casing also being provided with intake ports extending parallel with the casing axis, means for feeding liquid to said intake ports, said means comprising a disk rotatable with said driving shaft, plates on said disk for feeding liquid to said intake ports, and a cylindrical flange on said disk surrounding said sleeve.

9. In a fluid transmission mechanism, the combination of driving and driven shafts, of a fluid transmission mechanism comprising a cylindrical casing secured to the driving shaft, fluid displacing gears mounted in said casing and a gear in mesh with said gears and secured to the driven shaft, said casing being provided with radially extending delivery ports, a sleeve surrounding said casing and slidably mounted thereon for controlling said ports, speed responsive means operatively connected to said driving shaft and to said sleeve for controlling said sleeve, means slidably mounted on said driving shaft for disabling said speed responsive means, said disabling means including a finger adapted to be moved to lock said speed responsive means in positions corresponding to a position of rest of the driving shaft and a position controlled by a predetermined speed of said driving shaft, and manual means for operating said disabling means.

10. In a fluid transmission mechanism, the combination of driving and driven shafts, a fluid displacing mechanism connecting said shafts for driving said driven shaft at variable speeds from said driving shaft, means for controlling the amount of fluid displaced for controlling the relative speeds of said shafts, a pivoted weighted arm for controlling said last mentioned means, means pivotally supporting said arm with respect to said driving shaft whereby said weighted arm is moved outwardly upon increasing the speed of said driving shaft, a finger slidably mounted on said driving shaft and adapted to be brought into position to lock said arm in either of the two positions corresponding to the position of rest of the driving shaft and the position it occupies when the driving shaft is rotated at a predetermined speed, and manual means for operating said disabling means.

11. The combination with a mechanism of the character described which includes a driving shaft, a driven shaft, a variable speed drive between said shafts, speed control means for controlling said drive and mechanical locking means under control of said speed control means for directly mechanically locking said shafts together for direct drive at predetermined speeds of said driving shaft, of manual means for maintaining said direct drive at lower speeds of said driving shaft whereby said driving shaft may be driven from said driven shaft at low speeds.

12. In a fluid transmission mechanism, the combination of driving and driven shafts, a fluid displacing mechanism operated by the driving shaft for transmitting motion to the driven shaft, means for controlling the amount of fluid displaced by said fluid displacing mechanism, means responsive to the speed of the driving shaft for controlling said fluid displacing controlling means, and manually controlled means for locking said speed responsive means in its no-speed position.

13. In a fluid transmission mechanism, the combination of driving and driven shafts, a fluid displacing mechanism operated by the driving shaft for transmitting motion to the driven shaft, means for controlling the amount of fluid displaced by said fluid displacing mechanism, means responsive to the speed of the driving shaft for controlling said fluid displacing controlling means, and manually controlled means for locking said speed responsive means in its high-speed position.

LOUIS GADDONI.